(12) United States Patent
Jeuch

(10) Patent No.: US 7,390,341 B2
(45) Date of Patent: Jun. 24, 2008

(54) LIQUID/GAS STATE SEPARATING DEVICE

(75) Inventor: Pierre Jeuch, Saint-Aubin (FR)

(73) Assignee: Thermagen SA, Gif-sur-Yvette (FR)

( * ) Notice: Subject to any disclaimer, the term of this patent is extended or adjusted under 35 U.S.C. 154(b) by 244 days.

(21) Appl. No.: 10/495,572

(22) PCT Filed: Nov. 13, 2002

(86) PCT No.: PCT/IB02/04735
§ 371 (c)(1),
(2), (4) Date: Aug. 25, 2004

(87) PCT Pub. No.: WO03/041841
PCT Pub. Date: May 22, 2003

(65) Prior Publication Data
US 2004/0261380 A1   Dec. 30, 2004

(30) Foreign Application Priority Data
Nov. 16, 2001   (FR) .................................. 01 14853

(51) Int. Cl.
*B01D 45/08* (2006.01)
(52) U.S. Cl. .......................... 55/462; 55/423; 55/434.4; 55/439; 95/267; 95/272; 96/239; 62/108
(58) Field of Classification Search .......... 261/DIG. 32, 261/108, 112.2, DIG. 31; 210/187, 180; 62/60, 100, 101, 107, 108, 293, 294, 498, 62/515, 516, 517, 518, 404–429; 55/462, 55/434.2, 434.3, 434.4, 437, 438, 439, 463, 55/464, 423; 95/267, 272; 96/236, 237, 96/238, 239, 256, 396; 159/16.1, DIG. 16
See application file for complete search history.

(56) References Cited

U.S. PATENT DOCUMENTS

| 1,857,887 | A |   | 5/1932  | Stein |             |
|-----------|---|---|---------|-------|-------------|
| 2,359,078 | A | * | 9/1944  | Baumann | ............ 159/31 |
| 3,642,059 | A | * | 2/1972  | Greiner | ............ 62/476 |
| 3,813,855 | A | * | 6/1974  | Hill et al. | ......... 55/440 |
| 3,816,239 | A | * | 6/1974  | Marks | ............... 162/15 |
| 3,970,068 | A |   | 7/1976  | Sato |              |
| 4,054,037 | A | * | 10/1977 | Yoder | ............. 62/224 |
| 4,126,016 | A |   | 11/1978 | Greiner |           |

(Continued)

FOREIGN PATENT DOCUMENTS

CH   182 955 A   3/1936

(Continued)

OTHER PUBLICATIONS

U.S. Appl. No. 10/495,510, filed May 14, 2004, entitled "Heat Exchanger" by Pierre Jeuch.

*Primary Examiner*—Duane Smith
*Assistant Examiner*—Robert Clemente
(74) *Attorney, Agent, or Firm*—Sughrue Mion, PLLC

(57) ABSTRACT

The invention relates to a liquid/gas state separating device capable of separating the molecules of vapour (V) of a liquid evaporating under the effect of a partial vacuum (31) maintained by pumping means from drops (L) of said liquid carried along by the flow of vapour (V), characterised in that it comprises a vapour deflector (50) and a drop collector (60), the vapour deflector (50) imposing at least one sudden change of direction on the flow of vapour (V).

18 Claims, 1 Drawing Sheet

U.S. PATENT DOCUMENTS

Figure 1:
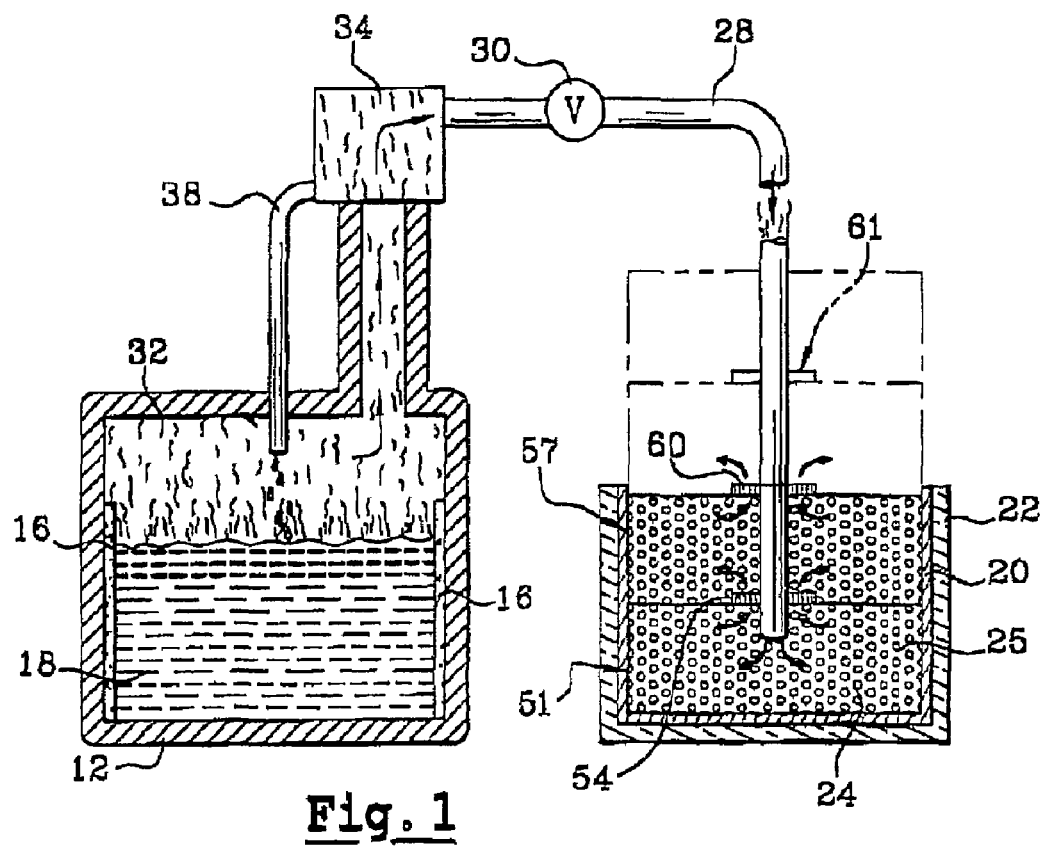

| | | | |
|---|---|---|---|
| 4,141,706 A * | 2/1979 | Regehr | 55/437 |
| 4,205,531 A * | 6/1980 | Brunberg et al. | 62/101 |
| 4,316,728 A * | 2/1982 | Caesar | 96/228 |
| 4,319,464 A | 3/1982 | Dodd | |
| 4,375,386 A * | 3/1983 | Windham | 159/31 |
| 4,669,273 A | 6/1987 | Fischer et al. | |
| 4,688,395 A | 8/1987 | Holcomb | |
| 4,736,599 A | 4/1988 | Siegel | |
| 4,770,748 A * | 9/1988 | Cellini et al. | 202/185.1 |
| 4,784,678 A | 11/1988 | Rudick et al. | |
| 5,018,368 A | 5/1991 | Steidl | |
| 5,054,544 A | 10/1991 | Kaubek et al. | |
| 5,079,932 A * | 1/1992 | Siegel | 62/293 |
| 5,201,183 A | 4/1993 | Ramos | |
| 5,207,073 A | 5/1993 | Maier-Laxhuber et al. | |
| 5,214,933 A | 6/1993 | Aitchison et al. | |
| 5,273,182 A | 12/1993 | Laybourne | |
| 5,331,817 A | 7/1994 | Anthony | |
| 5,440,896 A | 8/1995 | Maier-Laxhuber et al. | |
| 5,447,039 A | 9/1995 | Allison | |
| 5,692,381 A | 12/1997 | Garrett | |
| 5,765,385 A | 6/1998 | Childs | |
| 5,845,499 A | 12/1998 | Montesanto | |
| 5,865,036 A | 2/1999 | Anthony | |
| 5,943,875 A | 8/1999 | Hymes | |
| 5,946,930 A | 9/1999 | Anthony | |
| 6,065,300 A | 5/2000 | Anthony | |
| 6,089,519 A | 7/2000 | Laybourne | |
| 6,103,280 A | 8/2000 | Tippetts et al. | |
| 6,324,861 B1 | 12/2001 | Jeuch | |
| 6,722,153 B2 | 4/2004 | Jeuch | |
| 6,797,040 B2 * | 9/2004 | Lenzing | 95/267 |
| 2003/0115901 A1 | 6/2003 | Jeuch | |

FOREIGN PATENT DOCUMENTS

| | | |
|---|---|---|
| EP | 0 261 673 A | 3/1988 |
| EP | 0 726 433 A1 | 8/1996 |
| EP | 0 931 998 A2 | 7/1999 |
| FR | 322 802 A | 2/1903 |
| FR | 528 092 A | 11/1921 |
| FR | 2 011 939 A | 3/1970 |
| FR | 2 696 533 | 4/1994 |
| FR | 2 762 076 | 10/1998 |
| SU | 1291183 A1 | 2/1987 |
| WO | WO 97/21964 A1 | 6/1997 |
| WO | WO 99/37958 A1 | 7/1999 |
| WO | WO 00/77462 A | 12/2000 |
| WO | WO 01/10738 A1 | 2/2001 |
| WO | WO 01/11297 A1 | 2/2001 |

* cited by examiner

LIQUID/GAS STATE SEPARATING DEVICE

The present invention relates to a liquid/gas state separating device capable of separating molecules of vapour of a liquid from drops of said liquid.

Such a separator is intended to be used in a heat exchanger for implementing cooling of a beverage by an evaporation and adsorption method. The principle of such a cooling method consists of evaporating a liquid under the effect of a partial vacuum maintained by adsorption of the vapours of said liquid.

The implementation of this method of cooling by evaporation and adsorption is known and has been the subject of much research in the prior art. Many devices have been proposed, associating a heat exchanger (evaporator) containing a refrigerant liquid to be evaporated and a reservoir containing an adsorbent, in particular for applications to self-cooling beverage packages.

According to the physical principle implemented, a refrigerant liquid contained in a heat exchanger is evaporated under vacuum. This evaporation is initiated by a partial vacuum brought about in the exchanger by activation of means of putting the heat exchanger into communication with pumping means, and then this partial vacuum is maintained by pumping the vapours of said liquid. Thus, the molecules of vapour of the refrigerant liquid are pumped and drops of said liquid can be carried along by the vapour. In fact, the pumping force can be such that drops of liquid L can be carried along to the pump and thus prejudice its correct operation. It is not impossible for the vapour molecules pumped by the partial vacuum to reach a speed of 1000 km/h.

It is therefore necessary to provide a liquid/gas state separator which allows passage of the vapour of the refrigerant liquid to be pumped and which returns the drops of liquid into the evaporator of the heat exchanger.

The problem of separation between the vapours and the drops of refrigerant liquid has clearly been identified within the context of applications to self-cooling packages, in particular in the patent U.S. Pat. No. 5,018,368, an illustration of which is given in FIG. 1. An evaporator 12 contains a liquid 18 evaporated by pumping by means of desiccants contained in a chamber 20. A mixture of vapour and liquid is thus drawn into a collector and liquid/gas state separator 34 of conventional design which separates the liquid carried along by the pumped vapours. The collector and state separator 34 has a outlet pipe 38 which returns the drops of liquid to the evaporator 12 and a conduit 28 which opens a way for the vapour to the desiccant chamber 20.

This patent clearly identifies the problem of separation of the vapours and drops of the refrigerant liquid, but the solution proposed is a conventional solution known to any chemist confronted with a similar problem. In fact, the solution described in this patent uses an intermediate receptacle of significant volume in which the pumped vapour is considerably slowed down. The drops of refrigerant liquid which would have been carried along by the vapour are thus separated from the vapour molecules by the effect of gravity since the speed of flow of the vapour is no longer sufficient to carry them along against the force of gravity. The liquid thus collected is taken back into the cavity of the evaporator by the outlet pipe 38. The implementation of this solution requires a non-negligible volume.

However, such a conventional solution is not directly applicable to a self-cooling beverage package having standardised shapes and dimensions, of a beverage can for example. This is because the miniaturisation of a state separating device is difficult to obtain on account of the conventional solutions being based on the use of a relatively large volume which allows a natural separation of the drops drawn by gravitational force from the gas molecules drawn by the partial vacuum.

The subsequent developments originating from the mentioned patent U.S. Pat. No. 5,018,368 have furthermore shown that persons skilled in the art had turned towards an evaporator containing a refrigerant gel for applications to packages of small dimensions, as for example described in the patents WO 00/50824 and WO 01/10738 concerning respectively a method of producing the gel and the use of such a gel for developing a heat exchanger.

The objective of the present invention is to resolve the drawbacks of the prior art.

To that end, the present invention proposes a miniaturised liquid/gas state separating device capable of being inserted into a heat exchanger disposed in a beverage package, such as a standardised can for example.

More particularly, the invention relates to a liquid/gas state separating device capable of separating the molecules of vapour of a liquid evaporating under the effect of a partial vacuum maintained by pumping means from drops of said liquid carried along by the flow of vapour, characterised in that it comprises a vapour deflector and a drop collector, the vapour deflector imposing at least one sudden change of direction on the flow of vapour.

According to one characteristic, the drop collector comprises at least one outlet pipe for the drops of length greater than or equal to the pressure loss of the vapour in the deflector.

According to one characteristic, a sudden change of direction of the flow of vapour is an upward movement.

According to one advantageous characteristic, the total volume of said device is less than or equal to 20 cm$^3$.

According to one characteristic, the drop collector comprises a funnel, the solid angle of which includes the partial vacuum source and the vapour deflector.

According to one characteristic, the vapour deflector comprises at least one wall forming a zigzag, said wall being disposed around the partial vacuum source and inside the solid angle formed by the drop collector.

According to one advantageous embodiment, the funnel constitutes a zigzag wall of the vapour deflector.

According to one embodiment, the device also comprises protection from direct splashes of drops, said protection being disposed opposite the partial vacuum source.

According to embodiment, the device is made of plastic or metal.

According to one application, the device is disposed in a heat exchanger containing a refrigerant liquid capable of evaporating under the effect of a partial vacuum maintained by pumping means associated with said exchanger.

According to embodiment, the pumping means are chosen from amongst the means constituted by an adsorbent material packed under air vacuum, a mechanical vacuum pump, and a cryogenic vacuum pump.

Figure 2:
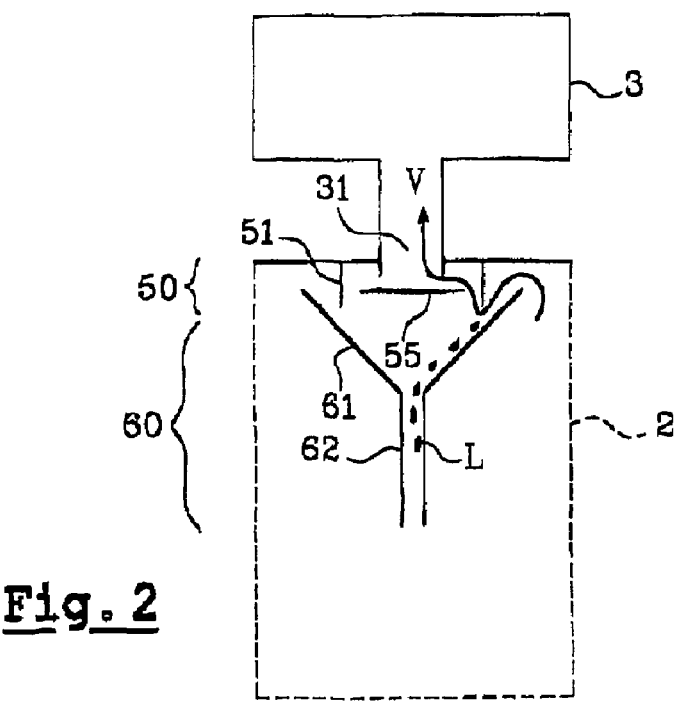

Other features and advantages of the present invention will emerge in the course of the following description given by way of an illustrative and non-limitative example, and produced with reference to the figures in which:

FIG. 1, already described, is a diagram of a known self-cooling device for beverages of the prior art;

FIG. 2 illustrates schematically the state separating device according to the invention.

The liquid/gas state separating device according to the invention, illustrated schematically in FIG. 2, comprises a vapour deflector 50 and a drop collector 60. This device can be integrated into a heat exchanger 2 containing a refrigerant liquid L capable of evaporating under the effect of a partial vacuum 31 maintained by pumping means 3.

The pumping means are associated with the heat exchanger 2 and can consist, according to application, of a mechanical vacuum pump, or cryogenic pumping means such as cold traps which condense the water vapours, or else an evacuated cartridge containing reagents (desiccants) capable of activating and maintaining the adsorption of the refrigerant liquid L.

The state separating device according to the invention has a vapour deflector 50 which consists of at least one wall forming a zigzag 51 imposing one or more sudden changes of direction on the flow of vapour V, preferably from the downward direction to the upward direction. The vapour molecules have a very small mean free path, of the order of a micrometre, which means they can change direction very quickly. On the other hand, the drops of liquid have a mass such that they are carried along by their inertia and thus separated from the gaseous flow. This mechanism advantageously allows liquid/gas separation without significant slowing down of the flow of vapour V and therefore does not require the occupation of a large volume.

The state separating device according to the invention also has, in addition, a drop collector 60 making it possible to take the drops of liquid L separated from the gaseous flow of vapour V back to the bottom of the cavity of the evaporator 2. The collector 60 comprises a funnel 61 and at least one outlet pipe 62 for the drops. The funnel 61 can advantageously contribute towards forming the zigzag 51 of the vapour deflector 50.

According to one advantageous embodiment, the vapour deflector 50 is advantageously disposed around the partial vacuum source 31 and the funnel 61 of the drop collector 60 defines a solid angle which includes the partial vacuum source 31 and the vapour deflector 50.

The collector 60 can be connected to the wall of the heat exchanger 2 by webs for example which constitute thin partitions allowing passage of the vapour V while holding the piece of the funnel 61 in position. The collector can also be held immovably attached to the zigzag 51. The funnel 61 then extends as far as the wall of the heat exchanger 2 containing the partial vacuum source 31 and has louvres allowing passage of the vapour V to the pumping means 3.

Preferentially, the outlet pipe for the drops 62 has a length greater than or equal to the pressure loss of the vapour V in the zigzag 51 in order to avoid the splashing of drops L through said outlet pipe 62. This pressure loss is advantageously measured as a water volume height. If, for example, a pressure loss of the vapour V of 1 mb (corresponding to 1 cm water column height) is considered, the pipe will be at least 1 cm long.

According to one advantageous feature, the state separating device according to the invention also comprises protection 55 from direct splashes of drops which completes the vapour deflector 50. This protection 55 is disposed opposite the partial vacuum source 31 in order to avoid direct contamination of the pumping means 3 in particular upon initiation of the adsorption reaction.

The liquid/gas state separating device according to the invention makes it possible to achieve the miniaturisation constraints required for applications to beverage packages in that the total volume of said device is less than or equal to 20 cm$^3$.

In the case of an application to self-cooling beverage packages, the state separating device according to the invention can be constituted in plastic material, by moulding, which allows great freedom of shape, or in metal of the same kind as the heat exchanger in which it is disposed, such as aluminium or steel for example, in order to facilitate recycling of the package.

The invention claimed is:

1. A liquid/gas state separating device integrated into a cavity of an evaporator containing a refrigerant liquid evaporating under the effect of a partial vacuum source maintained by a pump, and comprising an outlet for gaseous flow of vapor, said device being capable of separating molecules of vapor of the evaporating refrigerant liquid from drops of said refrigerant liquid carried along by the flow of vapor, said device further comprising:
   a vapor deflector imposing at least one sudden change of direction on the flow of vapor toward the outlet, and
   a drop collector taking the drops of liquid separated from the gaseous flow of vapor back to the bottom of the cavity of the evaporator, wherein the drop collector comprises at least one outlet pipe for drops, said outlet pipe having a length greater than or equal to the pressure loss of the vapor in the deflector.

2. A liquid/gas state separating device according to claim 1, wherein said sudden change of direction is an upward movement.

3. A liquid/gas state separating device according to claim 1, wherein the total volume of said device is less than or equal to 20 cm$_3$.

4. A liquid/gas state separating device according to claim 1, wherein the device further comprises protection from direct splashes of drops, said protection being disposed opposite the partial vacuum source.

5. A liquid/gas state separating device according to claim 1, wherein the device is made of plastic.

6. A liquid/gas state separating device according to claim 1, wherein the device is made of metal.

7. A liquid/gas state separating device according to claim 1, wherein the pumping means are chosen from amongst the means constituted by an adsorbent material packed under air vacuum, a mechanical vacuum pump, and a cryogenic vacuum pump.

8. A liquid/gas state separating device according to claim 1, wherein the device is disposed in a heat exchanger containing a refrigerant liquid capable of evaporating under the effect of a partial vacuum maintained by pumping means associated with said exchanger.

9. A liquid/gas state separating device according to claim 1, wherein the device is disposed in a heat exchanger containing a refrigerant liquid capable of evaporating under the effect of a partial vacuum maintained by pumping means associated with said exchanger.

10. A liquid/gas state separating device integrated into a cavity of an evaporator containing a refrigerant liquid evaporating under the effect of a partial vacuum source maintained by a pump, and comprising an outlet for gaseous flow of vapor, said device being capable of separating molecules of vapor of the evaporating refrigerant liquid from drops of said refrigerant liquid carried along by the flow of vapor, said device further comprising:
   a vapor deflector imposing at least one sudden change of direction on the flow of vapor toward the outlet, and
   a drop collector taking the drops of liquid separated from the gaseous flow of vapor back to the bottom of the cavity of the evaporator, wherein the drop collector comprises a funnel, the solid angle of which includes the partial vacuum source and the vapor deflector.

11. A liquid/gas state separating device according to claim 10, wherein the vapor deflector comprises at least one wall forming a zigzag, said wall being disposed around the partial vacuum source and inside the solid angle formed by the drop collector.

12. A liquid/gas state separating device according to claim 11, wherein the funnel constitutes a zigzag wall of the vapor deflector.

13. A liquid/gas state separating device according to claim 10, wherein said sudden change of direction is an upward movement.

14. A liquid/gas state separating device according to claim 10, wherein the total volume of said device is less than or equal to 20 $cm_3$.

15. A liquid/gas state separating device according to claim 10, wherein the device further comprises protection from direct splashes of drops, said protection being disposed opposite the partial vacuum source.

16. A liquid/gas state separating device according to claim 10, wherein the device is made of plastic.

17. A liquid/gas state separating device according to claim 10, wherein the device is made of metal.

18. A liquid/gas state separating device according to claim 10, wherein the pumping means are chosen from amongst the means constituted by an adsorbent material packed under air vacuum, a mechanical vacuum pump, and a cryogenic vacuum pump.

* * * * *